United States Patent [19]
Hoffrichter et al.

[11] 4,096,519
[45] Jun. 20, 1978

[54] CIRCUIT ARRANGEMENT FOR RESETTING THE SIGNAL LEVEL OF A DARKEST AREA OF A COLOR OR MONOCHROME IMAGE REPRODUCTION APPARATUS

[75] Inventors: Ingo Hoffrichter, Kiel; Hans-Georg Knop, Heikendorf, both of Germany

[73] Assignee: Dr.-Ing. Rudolf Hell GmbH, Kiel, Germany

[21] Appl. No.: 747,550

[22] Filed: Dec. 6, 1976

[30] Foreign Application Priority Data

Dec. 9, 1975  Germany .............................. 2555293

[51] Int. Cl.² .................................................. G03F 3/00
[52] U.S. Cl. .............................................. 358/75; 358/79; 358/80
[58] Field of Search ....................... 358/75, 79, 80

[56] References Cited

U.S. PATENT DOCUMENTS

3,194,883  7/1965  Ross ................................... 358/80

*Primary Examiner*—Robert L. Richardson
*Attorney, Agent, or Firm*—Ernest F. Marmorek

[57] ABSTRACT

In the scanning and reproduction apparatus, the signal level of the "black point" or darkest portion of an image, is automatically adjusted without disturbing the previously adjusted white level, by placing a level adjusting circuit in the signal path between the scanner and the reproduction device and including in the adjusting circuit elements affecting a decrease of the operational signal from black to white thereby avoiding disturbing the white level, and wherein the derived image signal of the darkest image portion or "black point" is checked against a reference signal as the scanning proceeds, and also checked for coincidence with the reference signal.

8 Claims, 5 Drawing Figures

CIRCUIT ARRANGEMENT FOR RESETTING THE SIGNAL LEVEL OF A DARKEST AREA OF A COLOR OR MONOCHROME IMAGE REPRODUCTION APPARATUS

CROSS-REFERENCE TO COMMONLY ASSIGNED CASES

Regarding the apparatus and method employed in the color reproduction of images, reference should be had to Brauch et al patent application Ser. No. 688,625; Baar patent applications Ser. No. 550,576 and Ser. No. 661,984 now U.S. Pat. No. 4,013,824; Dolves et al patent application Ser. No. 666,494 now U.S. Pat. No. 4,013,831; Mollgard patent application Ser. No. 728,956; and Gall patent application Ser. No. 693,938 of the present assignee in order to facilitate understanding some of the components assumed to be known herein.

FIELD OF THE INVENTION

The invention relates to a circuit arrangement for resetting a lowest brightness level of color-signals by means of adjusting arrangements in the case of the point-by-point and line-by-line reproduction of colored image patterns with photoelectric transducers to obtain color-signal voltages for the individual color separations or components.

Since the circuit arrangement is to be used in the case of a black-white scanner as well as in the case of a color scanner, both types of scanners will be described and the problem to be solved will be outlined.

BACKGROUND OF THE INVENTION

In a reproduction process, a black-white scanner is used for the purpose of obtaining, from an image, a corrected reproduction which is adapted to the subsequent printing process and from which the printing form is later reproduced.

For the obtaining of an image signal, an image which is mounted in a stretched out manner on a rotating scanning drum, is scanned point-by-point and line-by-line. Depending on whether a normal image or a transparency image is to be reproduced, the light which depending on the image type is either reflected or transmitted by the image, arrives at a scanning member, which is guided parallel along the scanning drum, and is photo-electrically converted by the scanning member into the image signal. The image signal represents the brightness or tone-values of the scanned image points. The tone-value extent is delineated by the tone-value "white" and "black." Through the scanning of a white image point of the image pattern, the so-called white point or level of maximal brightness, a maximum image signal is created and by scanning an image point, of lowest brightness, sometimes referred to as black point, a minimum image signal is created.

The image signal arrives at a gradation stage, where a basic gradation is preselected which depends on the print type, the printing process and the print carrier, and where, in addition, the gradation for the desired editorial changes of the reproduction with respect to the original, is varied.

The image signal which is modified in the gradation stage, modulates the brightness of a recording lamp serving as recording member. The record-carrier which is in the form of a film, is mounted in a stretched-out manner on a similarly rotating recording drum and is illuminated point-by-point, and line-by-line by the recording lamp carried axially along the recording drum. The light exposed and developed film serves for the production of the printing form.

The brightness or tone-values "white" and "black" are fixed end-values of the gradation curve. For the change of the tone-value course of the reproduction with respect to the original, one solely changes the shape of the curve between the fixed end values. In order to establish these end values, standardize voltage levels of the image signal are assigned to the brightness or tone-values "white" and "black" which, in the following, will be designated as white-level for the brightness or tone-value "white" and as black-level for the brightness or tone-value "black." However, since the images have different brightnesses and contrasts, dissimilar image-signal voltages occur during the scanning of the of maximal or minimal brightness points of the different images. Therefore, one is faced with the task of having to adjust the image-signal voltages to the black-level or to the white-level, prior to the reproduction of an image.

In the case of the conventional scanners, the adjustment takes place by means of adjusting potentiometers. For this purpose, a white-point of the image is placed below the scanning element and the image-signal-voltage is raised to the white-level through rotation of a potentiometer and with the aid of a voltmeter. Subsequently, a black-point, or point of lowest brightness of the image is scanned and the corresponding image-signal-voltage is lowered to the black-level by changing the setting of an additional potentiometer.

These adjusting processes have to be controlled and, should the need arise, must be iteratively repeated, since an accurate adjustment can only take place through approximation, owing to the fact that the potentiometers are limited in their operational accuracy.

A color scanner is used for the reproduction of a colored image-pattern, in order to produce brightness corrected individual colors, or color components, from the image-pattern to be reproduced. The colors, or color components again serve for the production of printing forms of a set of color plates for multi-color printing.

In the case of a color scanner, the light which had been reflected or transmitted by the colored image-pattern is split up into three partial rays, which are conveyed to one color-channel each. The following are assigned to the color-channels, namely color filters for the color separation and photo-electrical transducers for obtaining of three color-signals, which represent the color portions of the scanned image points, whereby the color-signals which had been converted into logarithmic signals, are proportional to the color densities.

For the purpose of color-correction, the color-signals are conveyed to a color-computer, at the outputs of which three corrected color component-signals are available for the recording of the colors, or color-components "magenta," "cyan" and "yellow." Via a color-separation-switch, the color-separation-signals are successively selected and, via a gradation-stage, are conveyed to a recording lamp, the brightness of which is modulated by the selected color-component-signal. The recording of the colors or color-components takes place by a point-by-point and line-by-line light exposure of a film, by means of the recording lamp. The light-exposed and developed film is the desired component of the image.

In the case of a color scanner it will likewise be necessary — prior to the recording of the color separations to set the white-level and the black-level individually for each image to be reproduced. In addition, an adjustment or balancing of all color-channels to the same sensitivity is necessary for the photo-electrical conversion of the incident scanning light into the color-signals.

For the adjustment of the color-signal-level of the white-point or level of maximum brightness, and of the black-point or level of lowest brightness, and for the balancing of the sensitivities of the color-channels, potentiometers are provided in the conventional color scanners, which potentiometers are likewise limited in their action and therefore require an iterative adjustment.

For the standardization of the color-signal-voltages two cases are to be distinguished:

a. The colored image pattern has a level of maximal brightness, and a level of lowest brightness, thus a "white-point" and a "black-point." In this case the color-signal-voltages of all color-channels which are obtained by the scanning of the "white-point," or point of maximal brightness have to be adjusted to the "white-level," and the color-signal voltages obtained by the scanning of the "black-point" or level of minimal brightness, have to be adjusted to the "black-level." Through the leveling of all color-signal-voltages to the white-level, a separate adjusting of the color-channels to the same sensitivity is not necessary.

To carry out the task described herein, the operating individual has to measure the color-signal-voltages separately for each color-channel with the aid of a voltmeter and carry out the balancing process through rotation of the potentiometer.

b. The colored image-pattern does not have a white or black image-point or levels of maximal and lowest brightness.

In this case, the brightest colored image point is selected as representing the "fictitious white-point" or maximal level, and the darkest image point is selected as the "fictitious black-point." The fictitious levels differ thereby from the true white-point or black-point by a color cast.

If this color cast is to be eliminated during the reproduction, that is to say if, for example, the darkest colored image-point is be reproduced as a purely black level, then the distinguishable color-signal-voltages obtained during the scanning of the fictitious black-point or level of lowest brightness have to be normalized to the black-level, and the color-signal voltages which had been obtained during the scanning of the fictitious white-point have to be normalized to the white-level. Thus, the task to be solved here is identical with the one described under point (a).

However, if this image is to be reproduced true to color, then the following procedure has to be carried out:

First of all, the color-channels need to be balanced to the same sensitivity and the color-signal-voltages, which have originated during the scanning of the fictitious white-point or level of maximal brightness, are adjusted to preset nominal or reference values.

Then the fictitious black-point or level of lowest brightness of the image is scanned while maintaining the previously adjusted values, whereby — depending on the color-composition of the fictitious black-point — three distinguishable color-signal-voltages are created, of which one may be at a minimum or minimal. value.

This minimum color-signal-voltage is then lowered or reset to the black-level. However, for a color-true reproduction, the relationships of the three color-signal-voltages characterizing one image-point must be mutually retained, so that after adjustment of the minimum color-signal-voltage to the black-level, also the other two color-signal-voltages must be proportionally reduced by a correction-factor which correspond to the difference between the minimum value and the black-level.

For the adjustment or setting of the color-signal-level of the black-point, or level of lowest brightness, the operation has to measure first of all all color-signal-voltages with a voltmeter, then has to ascertain the minimum value and calculate the correction factor. With the aid of the calculated correction factor, the operator then has to determine the value to be set, and set the same by rotation of potentiometers. Since the potentiometers have their limitations, when balancing for the black-, and white-level, the adjustments performed have to be repeatedly controlled and corrected in cases of need, which involves a considerable expenditure in time.

However, for a rational use of a scanner it is necessary that the adjustment time for a reproduction process be of as short a duration as possible with respect to the actual reproduction time. However, shorter adjustment times can only be attained, if as many adjustments as possible are automatized.

Attempts have been made to replace the potentiometer which is required for the level-balancing and which is to be manually operated, by a motor-driven potentiometer. However, the use of this motor-driven potentiometer does not lead to the desired result, since — owing to the required high degree of accuracy — the attained adjustment time is not substantially shorter than in the case of the conventional method.

SUMMARY OF THE INVENTION

The present invention deals with the adjustment of the color-signal-level of the black-point, or level of lowest brightness.

The invention has for its object to provide a circuit arrangement for the automatic adjustment for the color-signal-levels of the black-point, or level of lowest brightness which does not affect the white-level calibration.

This circuit arrangement is to substantially shorten the total adjustment time and relieve the operators from routine tasks, so that they can concentrate more on subjective tasks such as, for example, on the color correction.

Advantageous further developments of the underlying thoughts of the invention are given in the dependent claims.

The salient features characterizing the invention and additional characteristics of the invention become apparent from the exemplified embodiments described in the following and illustrated in FIGS. 1 to 5.

DESCRIPTION OF THE PREFERRED EMBODIMENTS

Figure 1:
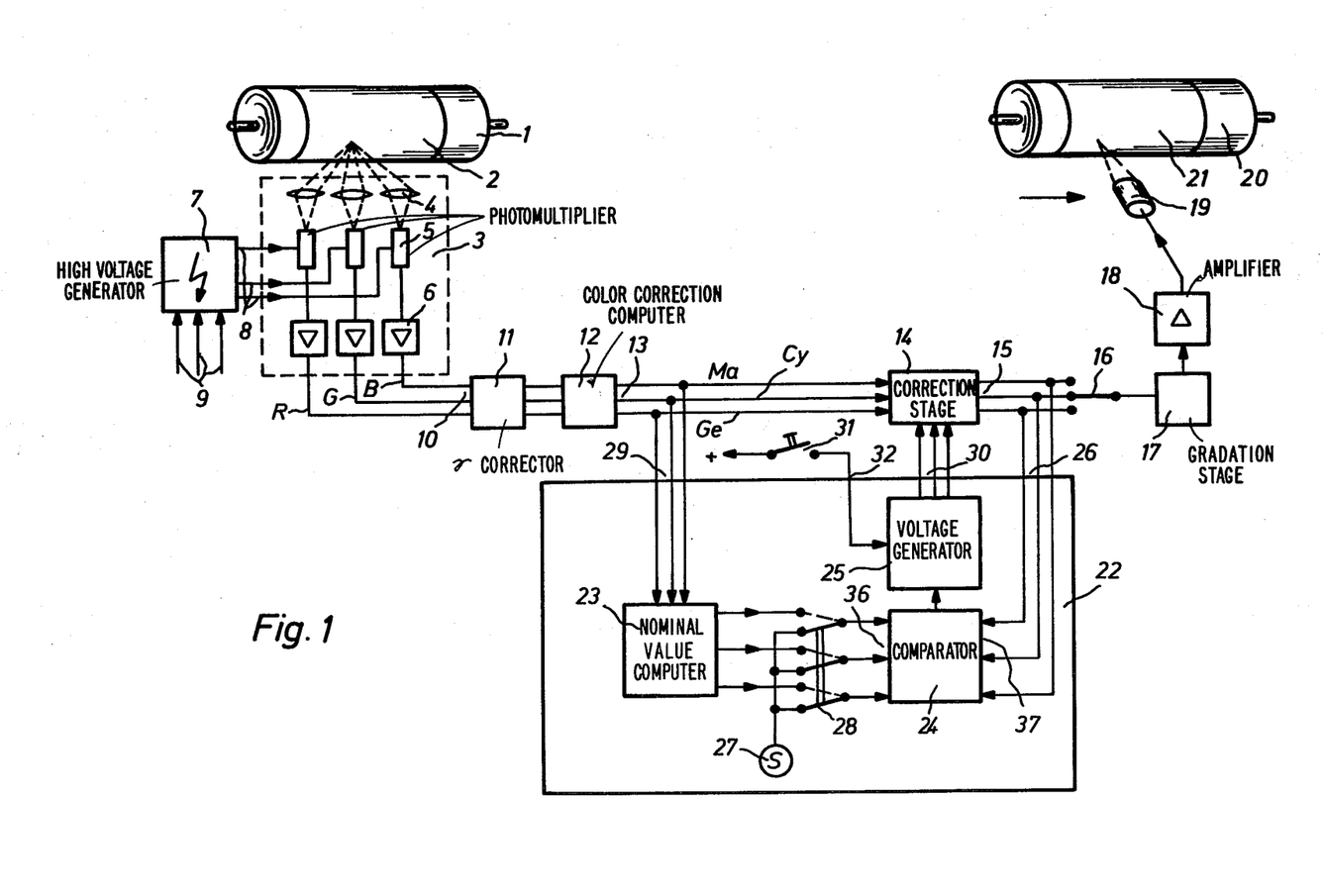
FIG. 1 shows a block diagram of a color scanner with a circuit for the setting of the color-signal levels of the black-point, or point of lowest (or minimal) brightness.

FIG. 1 shows a principal block diagram of a color scanner with a circuit arrangement designed according to the invention for the setting of the color-signal-level of the black-point, or level of minimal brightness.

Onto a rotating scanning drum 1 a colored image-pattern 2 which is to be reproduced, is mounted in a stretched-out manner, with the image-pattern 2 being scanned point-by-point and line-by-line by means of a light source which is not illustrative here. In the case of a direct view image pattern the reflected light arrives at a scanning member 3 which is guided parallel along the scanning drum 1, and in the case of a transparency image of the image pattern, the transmitted light arrives at the scanning member 3. In the scanning member 3 the received light is split up into three color-components and fed into three color-channels. To each color-channel, a color-filter 4 for the color-separation, a photomultiplier 5 and an amplifier 6 for the photo-electrical conversion of the color components of the scanning image-points into the color-signals "red" (R), "green" (G) and "blue" (B) are assigned.

The operating voltages determining the amplification magnitude of the photomulitpliers 5 are generated by a high voltage generator 7 and are conveyed via lines 8 to the photomultipliers 5. The operative voltages can be set by means of the control signals which arrive at the high voltage generator 7 via lines 9. With the aid of these control signals, the color-signal levels can be adjusted during the scanning of a white-point, or level of maximum brightness.

The outputs of the scanning member 3, at which the three color-signals (R), (G) and (B) are available, are connected via lines 10 with a logarithm-forming stage or γ corrector 11, serving for the conversion of the color-signal voltages into density-proportional values. The logarithm-forming stage 11 is connectd to a color computer 12 for the execution of the color-correction. At the outputs of the color-computer 12, the three corrected color-separation or component signals "magenta" (Ma), "cyan" (Cy) and "Yellow" (Ye) appear which are available for the recording of the individual color components. The color-component signals are conveyed via lines 13 to a correcting-stage 14, which in turn is connected via lines 15 with a color-separation-switch 16. With the aid of the color-separation-switch 16 one of the color component signals is selected for the recording of the corresponding color-component. In the exemplified embodiment, the color-component signal "cyan" is conveyed via the color-separation-switch 16 to a gradation-stage 17, which is connected with a recording lamp 19 by means of end stage amplifier 18. The recording lamp 19, the brightness of which is modulated by the color component or separation-signal, moves axially along a similarly rotating recording drum 20, and point-by-point and line-by-line illuminates the film 21, which is mounted on drum 20 in a stretched-out manner. The exposed and developed film shows the desired color component of the image.

As mentioned in the introductory portion of the specification, prior to the recording of the color-separations, the white-level is first of all adjusted by the control signals supplied to lines 9. The subsequent adjustment of the black-level should not influence the white-level adjustment previously carried out.

For the automatic adjustment of the black-level during the scanning of a true or fictitious black-point, or level of minimal brightness, the invention provides a regulating arrangement 22, which comprises a nominal or reference value computer 23, a comparator 24, and a voltage generator 25, and wherein a correcting-stage 14 is arranged within the signal-path of the corrected color component signal.

The regulating quantity X is in the form of the output-signals of the correcting-stage 14, which signals arrive at the comparator 24 via the lines 15 and via the control input 26 of the regulating arrangement 22. Depending on the task to be performed, the nominal-value-inputs of the comparator 24 are connected with the nominal-value computer 23 or with a constant voltage source 27.

For the reduction of all three color-component signals to the black-level, as it is necessary in the case of a reproduction of an image-pattern containing a true black-point or minimal brightness level, or for the color cast-compensation in the case of a fictitious black-point, a nominal or reference value signal corresponding to the black-level S is transferred by thr constant voltage source 27 to the comparator 24 via a switch 28. The switch 28 is then located in the position illustrated by the solid lines.

For the color-true reproduction of an image-pattern having a fictitious black-point, the nominal-value computer 23 produces the nominal values for the adjustment of the color-signal-level of the black-point from the color-component signals of the black-point, which color-component signals arrive at the nominal-value computer 23 via the lines 13 and an input 29 of the regulating arrangement 22. For this purpose, the nominal-value computer 23 determines first of all the minimum or minimal value of the three color-component signals and substracts this value from all three color-component signals. The difference-signals are the desired nominal or reference values, which are conveyed to the comparator 24 via the switch 28. In the case of the color-true reproduction, the switch 28 is then located in the position illustrated by the dashed line.

As a result of comparing the nominal or reference value for the black-level S or of the computed nominal or reference values as above with the actual values of the color-signal voltages of the black-point, voltages are formed in the comparator 24, which control the voltage generator 25. The voltage generator 25 generates control signals assigned to the three color-channels, which control signals are conveyed to the correcting-stage 14 via a regulating signal output 30 of the regulating device 22. With the aid of these regulating signals, the color-component signals of the black-point are adjusted to the black-level or to the computed nominal values. The regulating process is initiated by the actuation of a press key 31, which is connected with a command input 32 of the regulating arrangement 22.

After the regulating process and during the reproduction process, the voltage generator 25 furnishes constant control signals.

As it will still have to be described, the correcting-stage 14 furnishes auxiliary signals during the recording process, which signals are dependent on the fluctuating color-component signals. On their part, the auxiliary signals have the effect that the influence exerted on the color-component signals by the control signals of the voltage generator, which control signals remain constant during the reproduction process, decreases from black to white. This type of influence is necessary since the setting of the color-signal level of the black-level should not change the previously executed setting for the white level.

It is within the scope of the invention, that the correcting stage 14 may be arranged ahead or behind the logarithm stage 11.

In actual practice, the color computer 12, in addition to the three color-component signals, also produces a fourth signal for the recording of an additional, so-called black and white, or monochrome image. Also this signal can, of course, be influenced by the correcting state 14.

Figure 2:
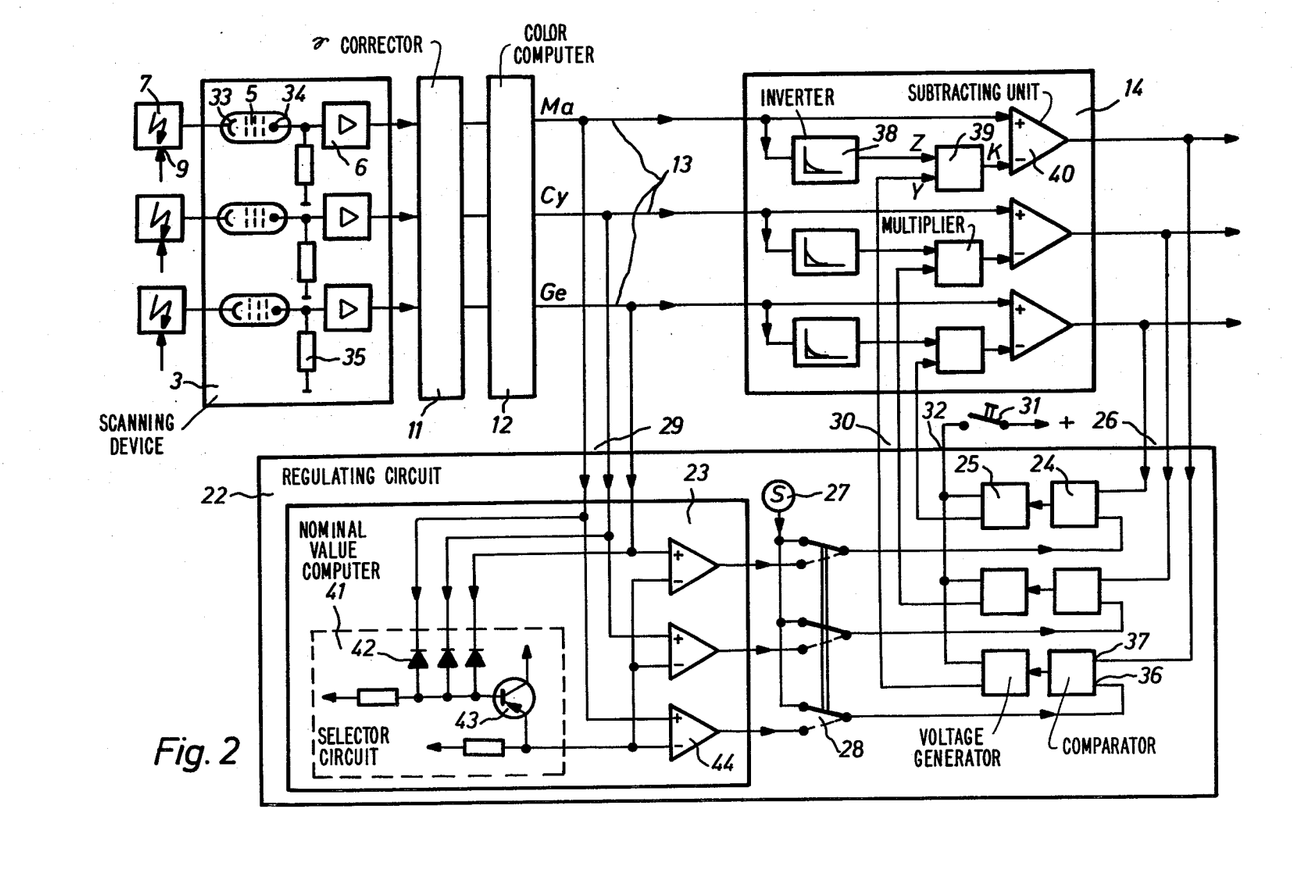
FIG. 2 shows an exemplified embodiment of the setting circuit.

FIG. 2 shows a detailed representation of the regulating arrangement 22 and of the correcting stage 14. For a better understanding, FIG. 2 furthermore shows the scanning member 3 and the signal-path of the color-separation or component signals.

The operating voltages are conveyed from the high voltage generators 7 to the cathodes 33 of the photomultipliers 5. The dynode-voltage-dividers are not illustrated. The anodes 34 of the photo-multipliers 5 are connected with the ground-potential by means of load resistances 35. The color-signal voltages tapped off at the load resistances 35, are amplified in the amplifiers 6 and are conveyed to the correcting-stage 14, via the logarithm stage 11 and the color-computer 12.

The regulating arrangement 22 operates as follows:

For the adjustment of the color-component signal of the black-point to the black-level S, the switch 28 is located in the illustrated position indicated by the solid lines, in which the constant voltage source 27 is connected with the nominal-value inputs 36 of the comparators 24. In this case, the constant voltage source 27 furnishes a voltage which is identical with the normalized black-level. The black-level frequently also corresponds to the voltage value zero. The actual-value inputs 37 of the comparators 24 are connected with the regulating input 26 of the regulating device 22. During the adjustment process, the regulating inputs 26 are supplied by the color-signal voltages, which are formed either through scanning of a true black-point or in the case of a compensation of the color-cast, through the scanning of a fictitious black-point.

At the beginning of the regulation process, the voltage generators 25 are switched into circuit by means of the press key 31. If the nominal or reference value present at one of the comparators 24 is greater than the corresponding actual value, this comparator 24 furnishes a voltage to the associated voltage generator 25 which thereupon generates a control signal Y with a monotonously increasing voltage shape. However, when the nominal or reference value is smaller than the actual value, the voltage generator provides a control signal Y with monotonously decreasing voltage shape. In the case of a coincidence of the inputs at one of the comparators 24, the associated voltage generator is stopped, and the voltage value attained at that moment by the control signal Y becomes fixed and is then retained.

The control signals Y are conveyed to the correcting stage 14 via the regulating or setting output 30 of the regulating device 22.

In the correcting stage 14, a waveform shaping means, for example an amplitude inverter 38, a multiplying unit 39 and a substracting unit 40 are assigned to each color-channel. The amplitude inverters 38, the inputs of which are in each case energized by one of the color-component signals, furnish the auxiliary signals Z at their inputs through amplitude inversion of the color-component signals. In the case of a color-component signal of a small order of magnitude, as it is obtained through scanning of a true or a fictitious black-point, a maximum auxiliary signal Z is generated. With increasing magnitude of the color-separation signal, the auxiliary signal Z decreases, and on scanning of a true or fictitious white-point, corresponding to a color-separation signal of a larger order of magnitude, attains the value zero.

The auxiliary signals Z and the control signals Y generated by the voltage generators 25, are the input quantities to the multiplying units 39, which furnish the correction signal $K = Z \cdot Y$.

The subtracting units 40 in the signal path of the color-component signals operate as adjusting elements for the color-component signals and are influenced by the correeection signals K.

The adjustment of the color-component-signal level of the black-point takes places as follows:

The nominal-value inputs 36 of the comparators 24, for example, are at ground-potential, whereas the actual value inputs 37 are acted upon by the output signals of the correcting stage 14.

For the adjustment of the color-signal levels a true black-point or shadow area is scanned or, in the case of a compensation of color cast, a fictitious black-point or shadow area is scanned. The color-component signals obtained thereby create three constant auxiliary signals Z in the amplitude inverters 38 during the adjustment time. At this time, changes of the correction signals K are solely dependent on the control signals Y of the voltage generators 25. A change of the correction signals K will occur only until the color-component signals at the output of the correcting stage 14 are compensated to zero through the correcting signals K due to the nominal value condition.

During the reproduction process, the control signals Y which had been fixed in the case of a coincidence of the input-values present at the comparator 24, are fed as constant quantities to the multiplying units 39, whereas the auxiliary signals Z change as a function of the color-separation signals, and control the influence of the control signals Y on the color-component signals.

During the scanning of a white-point or highlight area of the image pattern, the auxiliary signals Z and the correcting signals K are equal to zero, so that the color-component signals of a white-point or highlight area are not modified in the correcting stage 14, and the previously set color-signal levels of the white-point or highlight area remain preserved.

On scanning of a black-point or shadow area of the image-pattern, the auxiliary signals Z have however maximum values, and the correcting signals K have values established by the setting of the color-signal levels of the black-point or shadow area, so that the influence exerted by the correction signal K on the color-component signals of a black-point or shadow area becomes fully effective.

For a color-true reproduction of an image-pattern having a fictitious black-point or shadow area, the switch 28 is located in the position indicated by the dashed lines, and the nominal-value inputs 36 of the comparators 24 are acted upon by the nominal-values produced in the nominal-value computer 23.

Subsequently, the fictitious black-point or shadow area of the image-pattern is scanned, whereby — depending on the color composition — three different color-separation signals are formed. These color-component signals of the black-point or shadow area are conveyed to a selector-circuit 41 of the nominal-value computer 23, in order to check for a minimum value. For this purpose lines 13 are in each case connected with the cathodes of the diodes 42, the anodes of which are jointly connected to the base of a transistor 43 which is acting as an emitter follower. The diode, which is supplied by the lowest voltage, conducts and, at the base of transistor 43, the minimum color-component signal, reduced by the drop across the diode, is applied. Since the emitter follower compensates the voltage loss and additionally the temperature drift of the diodes 42, the minimum value M of the color-component signals of the black-point or shadow area appears at the output of the selector-circuit 41, with the minimum value M being conveyed to the negative inputs of the subtracting units 44 of the nominal-value computer 23. The positive inputs of the substracting units 44 are energized by the color-component signals of the black-point or shadow area. At the output of the subtracting-units 44, the three different nominal or reference values for the regulating process are available in the form of difference-signals.

Figure 3:
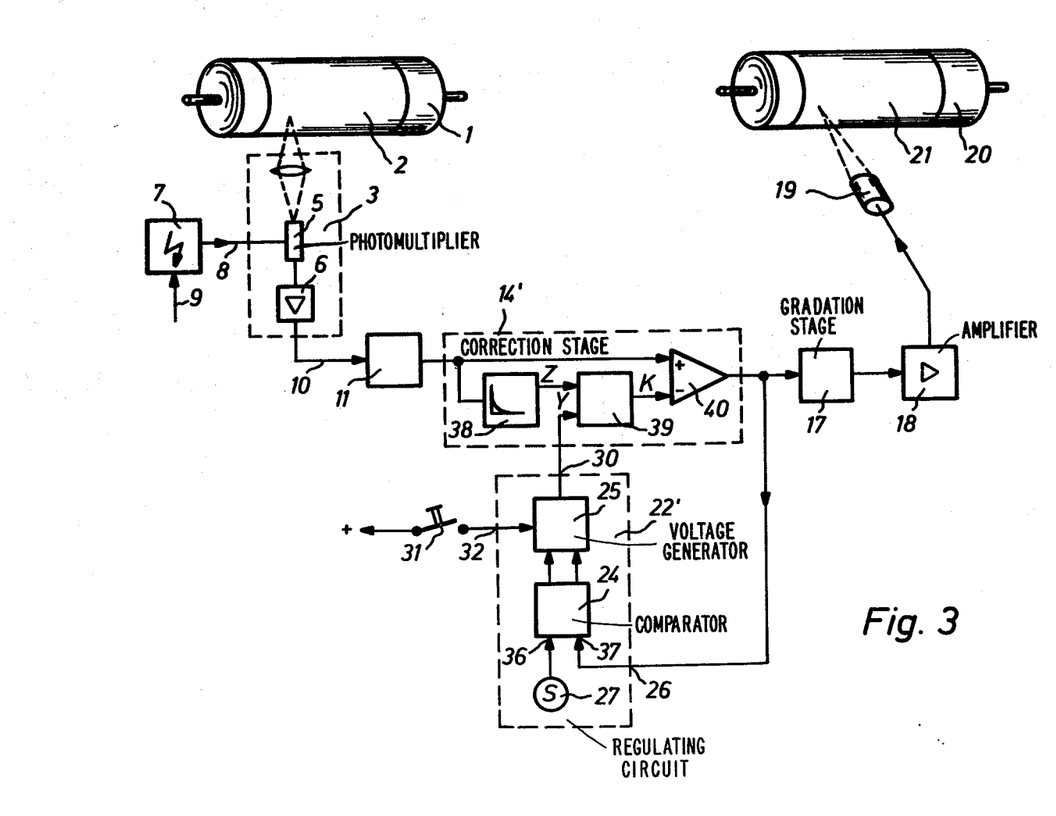
FIG. 3 shows a block diagram of a black-white-scanner with a simplified circuit for the setting of the black-level.

FIG. 3 shows a simplified example of the circuit of the regulating arrangement, which is designed according to the invention, and serves for the setting of the black-level in the case of a black-white or monochrome scanner.

In the case of a black-white or monochrome scanner, the black-white image-pattern 2 to be reproduced, is mounted in a stretched out manner on the rotating scanning drum 1, which image pattern 2 is scanned point-by-point and line-by-line by a scanning member 3 for the purpose of obtaining an image-signal. The scanning member 3 contains only one photomultiplier 5 and one amplifier 6 for the opto-electrical conversion of the light received by the scanning member 3 — into the image-signal. The operationg voltage is conveyed to the photomultiplier 5 likewise from a high voltage generator 7, via a line 8. The operating voltage is controllable by means of a control-signal fed to the high-voltage generator 7 via a line 9. The image-signal is conveyed to a gradation-stage 17 via a logarithm stage 11 and via a correcting stage 14'. The image-signal which had been modified in the gradation stage 17 arrives, via an end stage amplifier 18, at a recording lamp 19, the brightness of which is modulated by the modified image-signal. The recording lamp 19 carries out the point-by-point and line-by-line recording by exposing a film 21 which is mounted in a streched-out manner on a similarly rotating recording drum 20.

For the setting of the black-level, a regulation device 22' is provided which is a simplified version of the regulating device 22 shown in FIG. 2, and is provided with the comparator 24 and the voltage generator 25.

As the regulation quantity X, the image-signal is conveyed to the comparator 24 via line 10 and via the regulating-input 26 of the regulating-device 22'. The nominal or reference value is the black-level S. As the setting signal Y, the voltage generator 25 furnishes a control signal to the correcting-stage 14', via the setting output 30 of the regulating-device 22'.

The correcting-stage 14' consists of an amplitude-inverter 38, of a multiplying-unit 39 and of a subtracting-unit 40 as the adjusting element in the signal-path of the image-signal.

Figure 4:
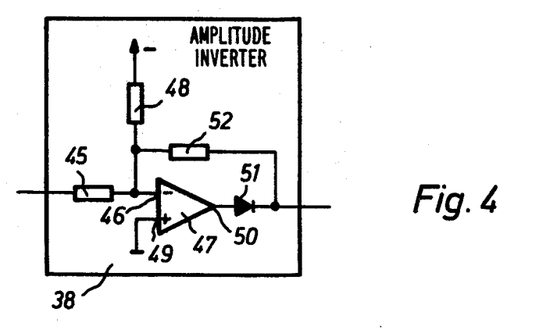
FIG. 4 shows an exemplified embodiment of an amplitude inverter.

FIG. 4 shows an exemplified embodiment of the amplitude-inverter 38. The amplitude inverter 38 is constructed in the form of an amplifier which inverts the amplitude of the input voltage.

The input voltage, in the exemplified embodiments either a color-component signal or the image-signal, is conveyed — via a resistance 45 — to the inverting input 46 of an operational amplifier 47. The inverting input 46 is moreover connected, via an additional resistance 48, with the negative pole of a voltage source which is not illustrated here. The non-inverting input 49 of the operational amplifier 47 is connected to the ground-potential. The output 50 of the operational-amplifier 47 is fed back to the inverting input 46 via a diode 51, — the cathode of which forms the output of the amplitude-inverter 38, — and via another resistance 52.

In the case of an input-voltage of zero, the inverting input 46 of the operational amplifier 47 is acted upon by a negative voltage and the output voltage of the amplitude-inverter 38 has a positive maximum amplitude established by the resistance 45 and 52. With an increasing input-voltage, the amplitude of the output-voltage of the amplitude-inverter 39 decreases. The ratio of the resistances 45 and 48 is chosen in such a manner, that the voltage at the inverting input 46 of the operational amplifier 47 becomes positive only shortly before the input-voltage attains the voltage-value of the white-level, and the output-voltage of the operational amplifier 47 becomes negative. The diode 51 then blocks, so that the output-voltage of the amplitude-inverter 38 is maintained at zero. Thus, the amplitude-inverter 38 shapes the the output-voltage as indicated in the functional-blocks 38 of FIGS. 2 and 3.

Figure 5:
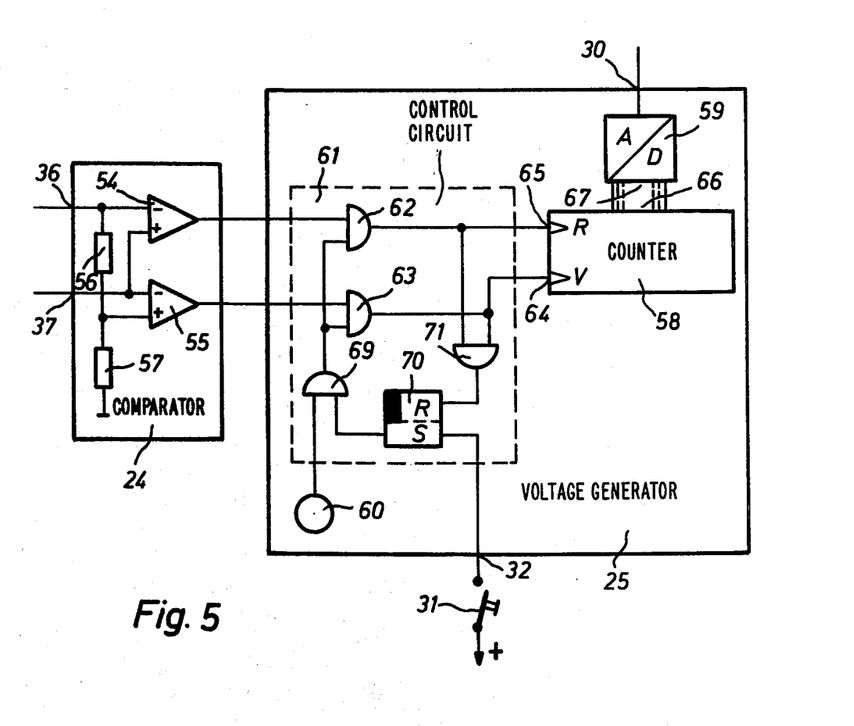
FIG. 5 shows an exemplified embodiment of a comparator and a voltage generator.

FIG. 5 shows an exemplified embodiment for the comparator 24 and the voltage-generator 25. The comparator 24 is made up of two comparing units 54 and 55. The non-inverting input of the comparing unit 54 and the inverting input of the comparing unit 55 are jointly connected with the actual-value input 37 of comparator 24. The inverting input of the comparing unit 54 is connected with the nominal-value input 36 of the comparator 24 and, via a relatively small resistance 56, it is connected with the non-inverting input of comparing unit 55, and this input is connected via an additional resistance 57 to the ground-potential.

The ratio of the resistance 56 and 57 establishes a nominal-value range for the comparator 24.

The comparing units 54,55 are preferably components of the LM 311 - type manufactured by the National Semiconductors Company. These components furnish a "TTL"-output-level, so that they can be directly combined with logic circuits.

The voltage generator 25 consists in essence of a forward - reverse - counter 58, of a D/A transducer 59, of a pulse generator 60 and of a control-circuit 61.

The outputs of the comparing units 55 and 54 in the comparator 24 are connected, via AND-gates 63 and 62 of the control-circuit 61, with the forward-counter-input 64 and with the reverse-counter-input 65 of the forward-reverse-counter 58, respectively.

The data-outputs 66 of the forward-reverse-counter 58 are connected to the digital-inputs 67 of the D/A-transducer 59, the analog-output of which forms the output of the voltage generator 25.

At this output 30 appears a control-signal which is proportional to the counting-state of the forward-reverse-counter 58, which control-signal can be influenced by the read-in or read-out of pulses of a counting pulse-train into or from the forward-reverse-counter 58, respectively.

The counting-pulse-train is created in the pulse generator 60. The pulse-generator 60, via an AND-gate 69 and via the AND-gates 62, and 63, of the control circuit 61, is connected with the forward-counting-input 64 or with the reverse counting-input 65 of the forward-reverse-counter 58. As a function of the output-levels of the comparing units 54 and 55, the counting-pulse either arrives at the forward input 64, or at the reverse input 65 of the counter 58.

The voltage generator 25 is switched into the circuit by the actuation of the press-key 31. Thereby an RS-flip-flop 70 of control-circuit 61 is tripped, and the Q-output of the RS-flip-flop 70 is set in the H-region and the AND-gate 69 is set. The counting-pulse-sequence can then reach the counting-inputs of the counter 58.

The mode of operation of the comparator 24 and of the voltage generator 25 is as follows:

Let us assume, to give an example, that the actual value is to be smaller than the nominal or reference value, then the output of comparing unit 55 lies in the H-region and the output of the comparing unit 54 lies in the L-region. The AND-gate 63 is set, and the counting-pulse-sequence reaches the forward-counting-input 64 of the counter 58, as a result of which the count is continuously increased and the control signal applied to the analog-output 30 of the D/A-transducer 59, increases in a monotonuous manner.

If the actual-value is equal to the nominal value, the outputs of both comparing units 54 and 55 are in the L-region, and the AND-gates 62 and 63 are blocked. The count of the counter 58 and therewith also the control signal's value just attained at this instant, are retained.

In this state, the output of an AND-gate 71 of the control-circuit 61, and the R-input of the RS-flip-flop 70 move into the L-region. The RS-flip-flop 70 is reset and the voltage-generator 25 is therefore switched-off.

It could also envisaged to use a forward-counter in the place of the forward-reverse-counter 58. In this case, the forward-counter would have to be reset in each case prior to the counting process, and the counting process will have to be started and stopped as a function of the output-levels of comparing units 54 and 55. The voltage generator 25 could also be made up of a saw-tooth generator, or step voltage generator of an analog storage unit installed following the generator.

I wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A circuit arrangement for resetting a lowest brightness level of a color signal having a plurality of colors variable in brightness from a black level to a white level for use in an apparatus including scanning and recording means for the point-by-point and line-by-line reproduction of a colored image, photo-electrical transducer means connected to said scanning means for obtaining color signal voltages from the corresponding colors, at least one of said lowest brightness levels being a minimal brightness level, comprising in combination for each of said colors:

adjustment means having an input and an output, and connectable between said photo-electric transducer means and said recording means for resetting one of said minimal brightness and lowest levels to a level having a predetermined relationship to said black level, voltage generator means for producing and feeding a control signal having selectable first and second waveforms of respective predetermined voltage values to the input of said adjustment means, comparator means having an output, a reference input and an actual value input, said actual-value input being connected to the output of said adjustment means for receiving an actual value of the corresponding one of said color signal voltages, reference means for providing a color signal voltage reference value to said reference input of said comparator means, said voltage generator means being connected to the output of said comparator means and providing at dissimilar values of said reference and actual values of the corresponding one of said color signal voltages the first waveform of said control signal to said adjustment means, said first waveform varying as a function of time, and waveform shaping means connected to the input of said adjustment means, said first waveform being controlled by said waveform shaping means for the control to diminish in a direction from said black level to said white level, said voltage generator means providing the second waveform of said control signal upon said reference and actual values of said one of said color signal voltages coinciding, and then retaining the instantaneous voltage values produced by said voltage generator means at the coincidence of said reference and actual values for a predetermined time.

2. A circuit arrangement according to claim 1, wherein said reference means comprises an adjustable constant voltage source having a voltage value corresponding to said minimal brightness level for compensating selected ones of the colors when reproducing the image.

3. A circuit arrangement according to claim 1, further comprising a reference-value computer having a plurality of inputs connected to corresponding ones of the inputs of said adjustment means, and a plurality of outputs connected to respective ones of said reference inputs for deriving said lowest brightness level and said reference values from corresponding ones of said color signal voltages, said minimal brightness level being settable to said black level.

4. A circuit arrangement according to claim 3, wherein said reference-value computer comprises a selection circuit for selecting the lowest brightness level from each of said color signal voltages, and substracting means for each of said color signal voltages for deriving respective voltage differences between said lowest voltages and said minimal voltage.

5. A circuit arrangement according to claim 1, wherein said waveform shaping means includes an amplitude inverter having an input for receiving a corresponding one of said color signal voltages, a multiplying unit having first and second inputs connected to the outputs of said inverter and said voltage generator means, respectively, and wherein said adjustment means includes a substracting unit having first and second inputs connected to the output of said multuplying unit and for receiving the corresponding one of said color signal voltages, respectively, whereby the output of said subtracting unit provides the corresponding one of said color signal voltages corrected with respect to any shift of the lowest brightness level thereof from the black level.

6. A circuit arrangement according to claim 5, wherein said amplitude inverter includes an operational amplifier, a voltage divider connected to the input of said operational amplifier, and rectifier means connected between the output of said operational amplifier and the input thereof, whereby the output voltage of said operational amplifier is settable to level off at a predetermined output voltage.

7. A circuit arrangement for resetting a lowest brightness level of a monochrome signal variable in brightness from a black level to a white level for use in an apparatus including scanning and recording means for the point-by-point and line-by-line reproduction of a monochrome image, photo-electrical transducer means connected to said scanning means for obtaining a monochrome signal voltage from said monochrome signal, comprising in combination:
 adjustment means having an input and an output, and connectable between said photo-electrical transducer means and said recording means for resetting of said lowest brightness level to said black level,
 voltage generator means for producing and feeding a control signal having selectable first and second waveforms of respective predetermined voltage values to the input of said adjustment means,
 comparator means having an output, a reference input and an actual value input, said actual-value input being connected to the output of said adjustment means for receiving an actual value of the corresponding one of said color signal voltages,
 reference means for providing a color signal voltage reference value to said reference input of said comparator means, said voltage generator means being connected to the output of said comparator means and providing at dissimilar values of said reference and actual values of the corresponding one of said color signal voltages the first waveform of said control signal to said adjustment means, said first waveform varying as a function of time, and
 waveform shaping means connected to the input of said adjustment means, said first waveform being controlled by said waveform shaping means for the control to diminish in a direction from said black level to said white level, said voltage generator means providing the second waveform of said control signal upon said reference and actual values of said one of said color signal voltages coinciding, and then retaining the instantaneous voltage values produced by said voltage generator means at the coincidence of said reference and actual values for a predetermined time.

8. A method for resetting a lowest brightness level of a color signal having a plurality of colors variable in brightness from a black level to a white level for use in an apparatus including scanning and recording means for the point-by-point and line-by-line reproduction of a colored image, photo-electrical transducer means connected to said scanning means for obtaining color signal voltages from the corresponding color, at least one of said lowest brightness levels being a minimal brightness level,
 the steps comprising for each of said color signal voltages:
 providing a color signal reference voltage having a reference value,
 comparing an actual value of one of the color signal voltages with said color signal reference voltage,
 providing at dissimilar values of said actual and reference values a first waveform, and at substantially identical values of said actual and reference values a second waveform, the first waveform varying as a function of time, the second waveform assuming a predetermined constant value, and
 resetting one of said minimal brightness and lowest levels to a level having a predetermined relationship to said black level, as a function of said waveforms.

* * * * *